United States Patent [19]
Nichols

[11] Patent Number: 5,100,556
[45] Date of Patent: Mar. 31, 1992

[54] TRANSVERSE SHEET MEMBRANE SEPARATION MODULE, COMPONENTS THEREOF AND RELATED METHODS

[75] Inventor: Randall W. Nichols, Westlake, Ohio

[73] Assignee: The Standard Oil Company, Cleveland, Ohio

[21] Appl. No.: 618,747

[22] Filed: Nov. 27, 1990

Related U.S. Application Data

[63] Continuation-in-part of Ser. No. 383,742, Jul. 21, 1989, Pat. No. 5,000,855.

[51] Int. Cl.⁵ ............................................. B01D 61/18
[52] U.S. Cl. .................................. 210/651; 210/652; 210/321.84; 210/456; 210/486
[58] Field of Search ................... 210/321.84, 456, 336, 210/486, 346, 232, 236, 652, 651

[56] References Cited

U.S. PATENT DOCUMENTS

| | | | |
|---|---|---|---|
| 546,527 | 4/1895 | Gudeman | 210/336 X |
| 661,189 | 11/1900 | Olsen et al. | 210/266 X |
| 3,198,335 | 8/1965 | Lewis et al. | 210/321 |
| 3,342,729 | 9/1967 | Strand | 210/23 |
| 3,492,698 | 2/1970 | Geary, Jr. et al. | 18/26 |
| 3,494,465 | 2/1970 | Nyrop | 210/194 |
| 3,684,097 | 8/1972 | Mathewson, Jr. et al. | 210/321 |
| 3,746,175 | 7/1973 | Markley | 210/500 X |
| 3,881,897 | 5/1975 | Faure et al. | 55/158 |
| 4,051,041 | 9/1977 | Riede | 210/541 X |
| 4,115,274 | 9/1978 | Boddeker et al. | 210/346 X |
| 4,207,192 | 6/1980 | Coplan et al. | 210/497.1 X |
| 4,210,536 | 7/1980 | Coplan et al. | 210/321 R |
| 4,225,439 | 9/1980 | Spranger | 210/321 R |
| 4,231,879 | 11/1980 | Spranger | 210/321 B |
| 4,292,178 | 9/1981 | Mori et al. | 210/352 |
| 4,371,438 | 2/1983 | Benattar et al. | 210/232 |
| 4,440,641 | 4/1984 | Ostertag | 210/321.3 |
| 4,592,839 | 6/1986 | Rosenburg | 210/352 |
| 4,639,353 | 1/1987 | Takemura et al. | 422/46 |
| 4,659,549 | 4/1987 | Hamada et al. | 422/48 |
| 4,735,718 | 4/1988 | Peters | 210/321.75 |

FOREIGN PATENT DOCUMENTS

| | | |
|---|---|---|
| 2811826 | 9/1978 | Fed. Rep. of Germany ........... 210/321.84 |
| 2222134 | 10/1974 | France . |

*Primary Examiner*—Frank Spear
*Attorney, Agent, or Firm*—Larry W. Evans; Joseph G. Curatolo; Sue E. Phillips

[57] ABSTRACT

A wafer (100) providing transverse sheets of semipermeable membrane (21). Such wafers include peripheral support means (101) defining a generally cylindrical ring and having inside (104) and outside surfaces (105), a plurality of transverse sheet membrane sleeves (16) carried within the peripheral support means, and a plurality of baffle plates (110, 125) carried between adjacent membrane sleeves. Apparatus (60) for the separation of a fluid into permeate and retentate portions comprises at least one transverse sheet membrane wafer (100), vessel means (61) providing a first port (68) for receiving the fluid, a second port (69) for withdrawing the retentate and a third port (70) for withdrawing the permeate, means for compressing (74) the wafer within the apparatus, and permeate chamber means (72) within said vessel, separate from the feedstream and the retentate by the means for compressing (74) and peripheral support means (101). Separate methods are also provided for the manufacture of the wafers as well as for the separation of fluid feedstreams into permeate and retentate portions.

16 Claims, 9 Drawing Sheets

TRANSVERSE SHEET MEMBRANE SEPARATION MODULE, COMPONENTS THEREOF AND RELATED METHODS

CROSS REFERENCE TO RELATED APPLICATION

The present application is a continuation-in-part of U.S. Pat. No. 5,000,855 issued Mar. 19, 1991.

The invention relates to a separation apparatus, or module, employing transverse sheets of semipermeable membranes for separating at least one fluid into permeate and retentate portions. The invention also relates to the use of a plurality of wafers coaxially disposed and compressed with a module having ports for admitting a feedstream fluid and for discharging the permeate and retentate portions of that fluid. Each wafer contains a plurality of short sleeves of membrane sheets wrapped around a porous support. The ends of each porous support terminate at the exterior surface of the wafer through which the filtered permeate flows.

The module is useful in microfiltration applications and can be employed for the separation of gases, liquids and mixtures thereof, hereinafter referred to as liquid feedstreams. Thus, a variety of membrane materials can be selected from known compositions as well as new membrane compositions which are continually being developed. As will become more apparent hereinbelow, the wafers employ relatively short membrane sheets which are no greater in length than the diameter of the wafer which is, in turn, significantly less than the overall length of the separation module.

BACKGROUND OF THE INVENTION

The use of membranes in various forms, such as sheets and hollow fibers, for the separation of fluids to obtain a desired portion of the fluid is well known. Generally, one or several components of the feed fluid permeate through the membrane and are collected as the permeate portion. The portion of the fluid that cannot pass through the membrane, the retentate, is retained and discharged as fresh portions of the fluid to be separated are supplied to the membrane.

Membrane separation modules are of two different types; hollow fiber and sheet membrane. The modules of the present invention are of the latter type. To date, the two most common configurations for sheet membrane modules have been of the plate and frame type or of the spiral wrap type.

In the plate and frame configuration, a sheet of membrane material is compressed between two rigid frames which hold it flat, provide support against the differential fluid pressure, and provide fluid flow ports to direct the fluid streams across the membrane surface. The plate and frame design requires a large number of components, with commensurate costs, per unit of membrane area. Sealing the frames against the membranes to achieve a tight seal without damaging the membrane is a problem.

U.S. Pat. No. 3,684,097, for instance, provides a plate and frame device for oxygenating or dialyzing blood which includes a pair of frames having rectangular openings and a gas permeable membrane on each face. A plurality of frames are stacked upon each other in substantial contact to define a thin blood film flow space therebetween.

U.S. Pat. No. 4,115,274 is directed toward a reverse osmosis desalinating apparatus which employs a series of porous discs, each covered on both sides by a membrane. The discs are compressed at their edges between pairs of module plates which are arranged in stacks. Alternate module plates in the stack are rotated through 180° to provide a zig-zag flow path. Desalinated water enters the porous discs by reverse osmosis and flows radially outward for collection.

U.S. Pat. No. 4,735,718 is directed toward a multi-layer membrane separator for the filtration of liquids. The separator provides at least two membrane units, each unit having first and second membrane sheet layers adhered to a filtrate spacer layer. First and second retentate spacers are in direct contact with first and second membranes, respectively and provide a plurality of channels for passage of filtrate and retentate.

In the spiral wrap configuration, a sheet of porous support material is enclosed is a long sleeve of sheet membrane. The sleeve is typically formed by folding a web of membrane over a web of porous support material then sealing the two edges of the membrane. The long section of sleeve is then rolled into a spiral so that a fluid to be treated can flow from one edge of the spiral to the other in the axial direction. The permeating fluid flows within the spiral sleeve and is collected by a permeate manifold at the center of the spiral. The spiral wrap design requires the permeate to flow around inside the spiral sleeve and through the porous support material for considerable distances. This results in performance penalties caused by a significant permeate pressure drop. The seal between the end of the membrane sleeve and the permeate discharge manifold is difficult to make reliably. The end of the membrane sleeve must be sealed and the sleeve seals are unprotected in the feel fluid stream. These sheet-to-sheet seals must remain tight for the life of the module. Membrane damage during the wrapping process and during subsequent shifting of the wrap are potential problems.

While the aforementioned art discloses some of the ways in which sheets of semipermeable membranes may be employed in a separator apparatus, it is nonetheless desirable to provide a novel wafer element providing a plurality of sheet membrane sleeves oriented transverse of the wafer, as well as a separation module, employing a plurality of such wafers in which the seals between adjacent wafers in the stack are maintained.

DISCLOSURE OF THE INVENTION

It is, therefore, an object of the present invention to provide a separation wafer carrying a plurality of supported transverse semipermeable membrane sheets.

It is another object of the present invention to provide a separation wafer in which sheets of semipermeable membrane materials are provided as sleeves which resist bending and other forces that may be encountered during assembly, handling and use.

It is still another object of the present invention to provide wafers containing transverse semipermeable membrane sheets separated by a plurality of baffle plates configured to generate vortices when subjected to externally-induced bi-directional pulsatile flow as the feedstream flows through the wafer.

It is yet another object of the present invention to provide a separation module containing at least one transverse sheet membrane wafer carrying layers of membrane sleeves arranged in layers chord-wise of the wafer.

It is another object of the present invention to provide a separation module containing at least one transverse sheet membrane wafer compressed within the module so that a fluid passing through the wafer is separated into a retentate portion and a permeate portion.

It is still another object of the present invention to provide a separation module containing at least one wafer providing a plurality of semipermeable membrane sleeves arranged in transverse parallel sheets having no exposed edge seals.

It is yet another object of the present invention to provide a separation module containing at least one wafer providing a plurality of layers of semipermeable membrane sleeves arranged in transverse parallel sheets said sheets being generally shorter than membrane sheets employed in existing plate and frame membrane separation devices.

It is another object of the present invention to provide a separation module which can be assembled in a variety of sizes from smaller wafers. Each wafer can be individually tested during assembly and can be readily removed should it fail during use.

It is still another object of the present invention to provide a method for the separation of fluids in a module employing at least one transverse sheet membrane wafer which allows materials to be transferred between the wafer and the feedstream.

It is yet another object of the present invention to provide a method for the manufacture of the wafers of the present invention.

In general, the present invention includes a wafer providing transverse sheets of semipermeable membrane. Such wafers include peripheral support means defining a generally cylindrical ring and having inside and outside surfaces, a plurality of transverse sheet membrane sleeves carried within the peripheral support means and a plurality of baffle plates carried between adjacent membrane sleeves.

The present invention also provides apparatus for the separation of a fluid into permeate and retentate portions comprising at least one transverse sheet membrane wafer, each wafer comprising peripheral support means defining a generally cylindrical ring; a plurality of transverse sheet membrane sleeves carried within the peripheral support means; and a plurality of baffle plates carried between adjacent membrane sleeves; vessel means providing a first port for receiving the fluid, a second port for withdrawing the retentate and a third port for withdrawing the permeate; means for compressing at least one wafer within the apparatus; and, permeate chamber means within the vessel, separate from the feedstream and the retentate by the means for compressing and the peripheral support means.

The present invention also provides a method for the manufacture of separation wafers having an outer peripheral wall and a plurality of semipermeable membrane sheet sleeves and baffle plates carried transversely within the wafer which comprises the steps of providing a rotatable mold, partially closed at the top by a slinger plate; placing a plurality of the semipermeable membrane sleeves and the baffle plates within the rotatable mold in alternating layers; rotating the mold at high speed while pouring a first solidifiable liquid onto the slinger plate to form a first annular ring within the mold encompassing a portion of the sleeves; then pouring a second solidifiable liquid onto the slinger plate to form the outer peripheral wall, encompassing a greater portion of the sleeves; stopping the rotation of the mold and removing the assembly of components therefrom; and, removing the first ring and the sleeves encompassed therein from the outer peripheral wall whereby a portion of the sleeves pass through the peripheral wall and open to the exterior of the wafer.

Finally, the present invention provides a method for the separation of fluid feedstreams into permeate and retentate portions comprising the steps of providing a separation module having a feedstream inlet and a retentate chamber, connected by at least one wafer withing the module, each wafer comprising a plurality of semipermeable membrane sleeves arranged chord-wise of the wafer, a plurality of baffle plates interspersed between adjacent membrane sleeves and peripheral support means encompassing the opposite open ends of the membrane sleeves; directing the feedstream through the feedstream inlet and over the wafer; separating the feedstream into a permeate portion, which permeates the membrane sleeves and flows through the peripheral support means into the permeate chamber, and a retentate portion, which passes around the membrane sleeves and into the retentate chamber; and removing the permeate and the retentate from the module.

At least one or more of the foregoing objects, and other objects which shall become apparent to those skilled in the art are described in greater detail with reference to the drawings and specification which follows.

PREFERRED EMBODIMENTS FOR CARRYING OUT THE INVENTION

The basic component of the various separation apparatuses of the present invention is a cylinder, depicted in FIG. 1 and hereinafter referred to as a wafer 10. The wafer 10 comprises an outer annular potting ring or peripheral support means 11 having upper and lower surfaces 12 and 13, respectively, an inner and outer cylindrical surfaces, 14 and 15, respectively. A plurality of short sleeves 16 of sheet membrane are wrapped around a support material 18 and are arrayed in a staggered, transverse and perpendicular orientation to the axis of the wafer. Each sleeve 16 is integrally mounted within the potting ring 11 and the opposite ends 19 and 20 thereof penetrate the ring and terminate at the outer surface 15.

Figure 2:
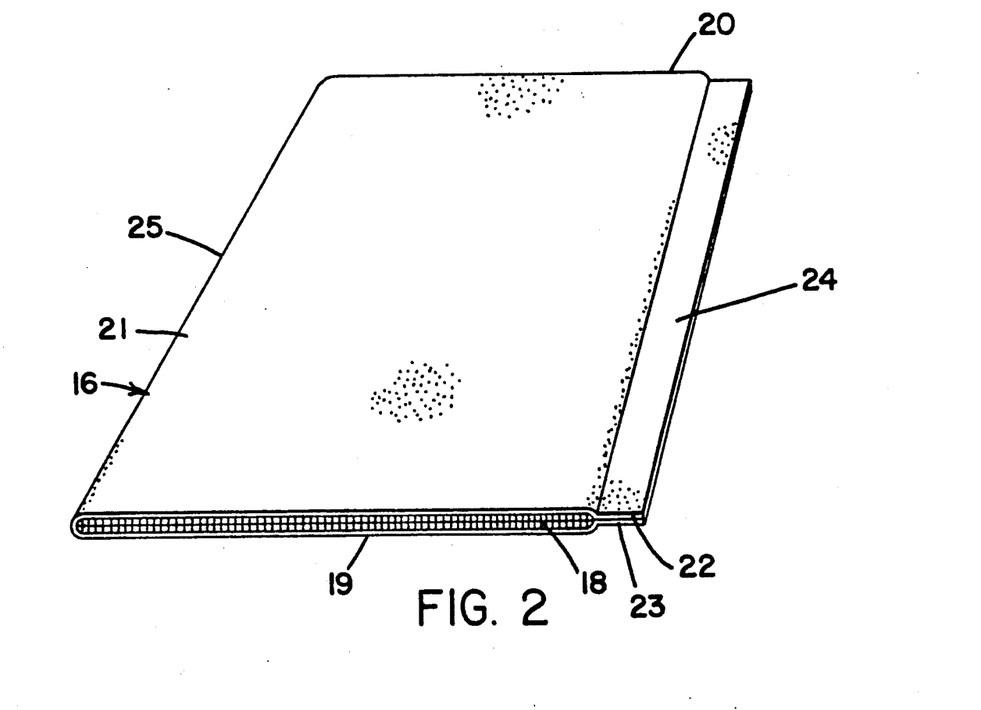
FIG. 2 is a perspective view of a single sleeve member.
Figure 3:
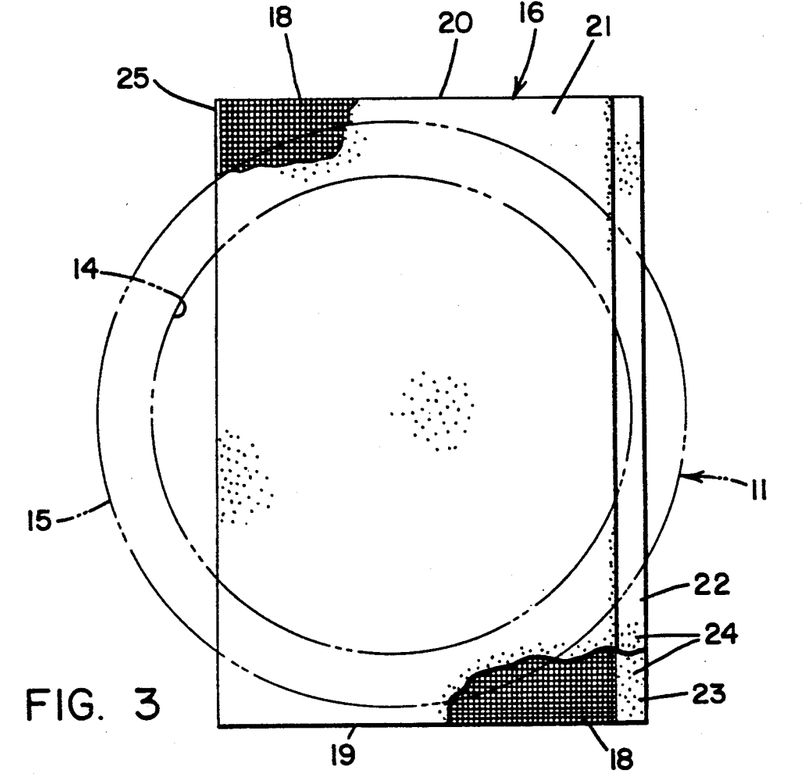
FIG. 3 is a top view of a single sleeve member superimposed over the annular support means of a wafer.

With reference to FIGS. 2 and 3, the construction of each sleeve 16 provides a continuous sheet of semipermeable membrane material 21 which is folded over a web of support material 18. The upper and lower edges 22 and 23 are joined and sealed tight, forming a seam 24 which protrudes away from the support web and is opposite the folded edge 25. As noted above, the sleeve 16 is open at the ends 19 and 20. Temporary joint sealing can be accomplished in any suitable manner including the use of a liquid adhesive, a hot melt adhesive, adhesive tape, or heat and pressure on the membrane edges 22 and 23.

With respect to the composition of the semipermeable membrane, substantially any membrane currently available, or which may subsequently become available, can be employed. Inasmuch as the composition and preparation of semipermeable membranes for the separation of a variety of gas mixtures and liquid mixtures, is well known to those skilled in the art, a detailed description thereof is not provided herein, it being understood that the present invention is not limited to any specific semipermeable membrane or method of preparation or fabrication.

The sleeves 16 are initially formed or cut into rectangular sections slightly longer than the outer diameter of wafer 10, depicted in phantom in FIG. 3, for assembly as will be discussed hereinbelow. Each sleeve 16 can be positioned on a porous support shelf 26 which separates adjacent sleeves 16. Support web 18 and support shelf 26 preferably comprise a screen of plastic or other suitable material which will allow the passage of gases and liquids therethrough. The thickness of the web 18 is not critical but may be sized for acceptable changes in pressure over one half its length. For the support shelf 26 a coarser, thicker screen can be employed so as not to unduly restrict passage of the feedstream through the wafer. Selection of materials may be made on the basis of strength and also resistance to the feedstream, as will be apparent to those skilled in the art.

Figure 5:
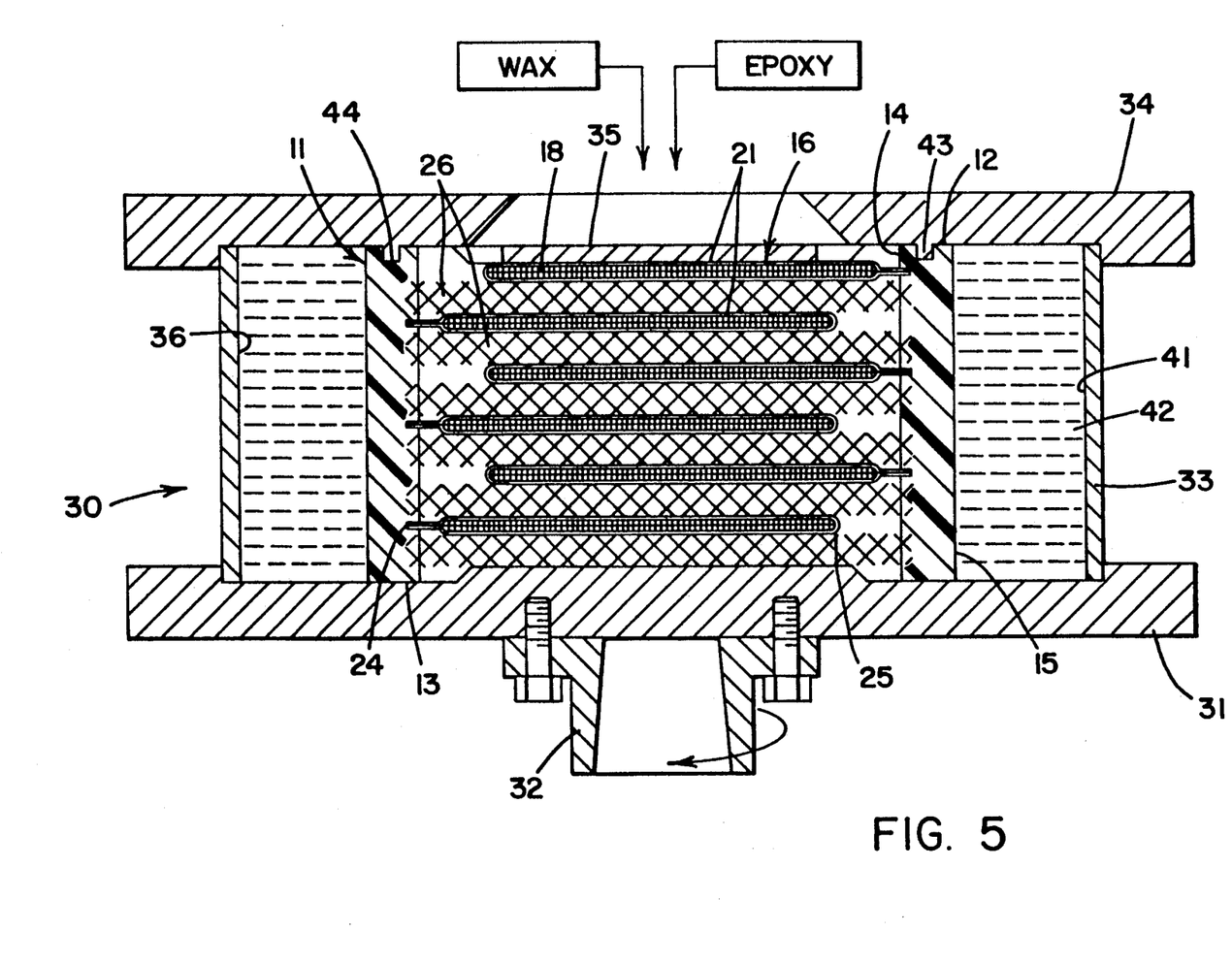
FIG. 5 is a side elevation, in cross-section, of a mold for fabricating the wafer member of the present invention and depicting the formation of a wafer therein.
Figure 6:
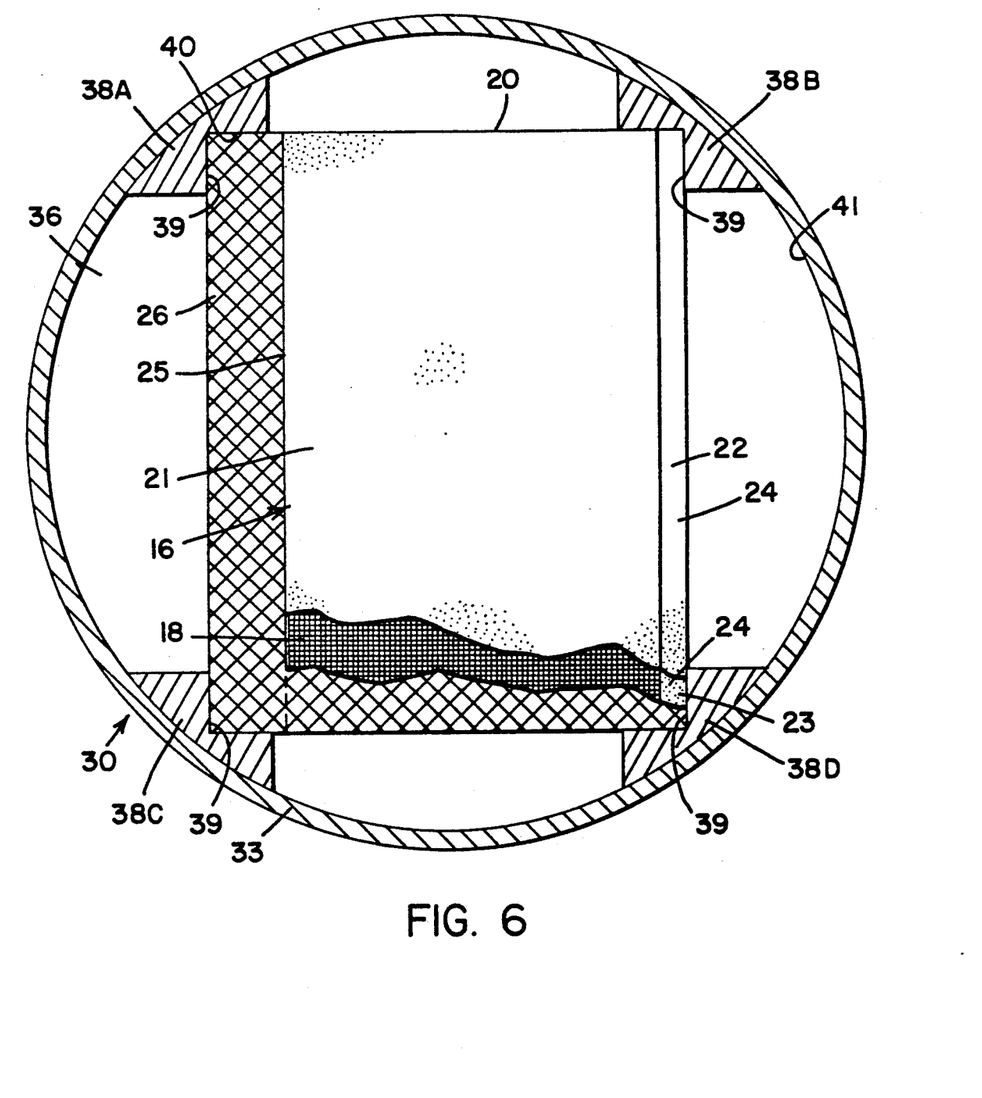
FIG. 6 is a top plan view of the mold for fabricating the wafer depicting the placement of components therein prior to fabrication.

The wafers 10 are manufactured by a potting technique utilizing a centrifuge. With reference to FIGS. 5 and 6, a mold 30 is provided which comprises a bottom section 31, fastened to the spindle attachment sleeve 32 of a centrifuge (not shown), a side mold section 33, a top mold section 34 and a slinger plate 35.

With reference to FIG. 6 the inside 36 of mold 30 is provided with four identical support brackets 38A-D, each said bracket providing 90 degree opposed faces 39 and 40. The support shelves 26 are cut to fit within all four brackets while the sleeves 16 are positioned between opposed bracket pairs 38A-38C or 38B-38D, that is, the length of sleeve 16 is the same as the length of shelf 26 but the width is narrower.

A porous support shelf 26 is placed within the bottom of the mold. Sleeves 16 are then placed in the mold with adjacent sleeves separated by subsequent shelves 26 and with seams 24 pointing in alternating directions, or 180° apart, as depicted in FIG. 5 by placement between brackets 38A-38C and then 38B-38D. Inside the mold 30, centrifugal force will tend to keep the off-centered membrane sleeves in position against the support brackets. The stack of sleeves and porous separator sheets is stacked to a height slightly less than the inside of mold 30 and, in turn, the wafer height. The mold top 34 is fastened in place and the mold is spun in a centrifuge to sufficient speeds to produce ten to 500 times the force of gravity at the periphery of the mold.

Figure 7:
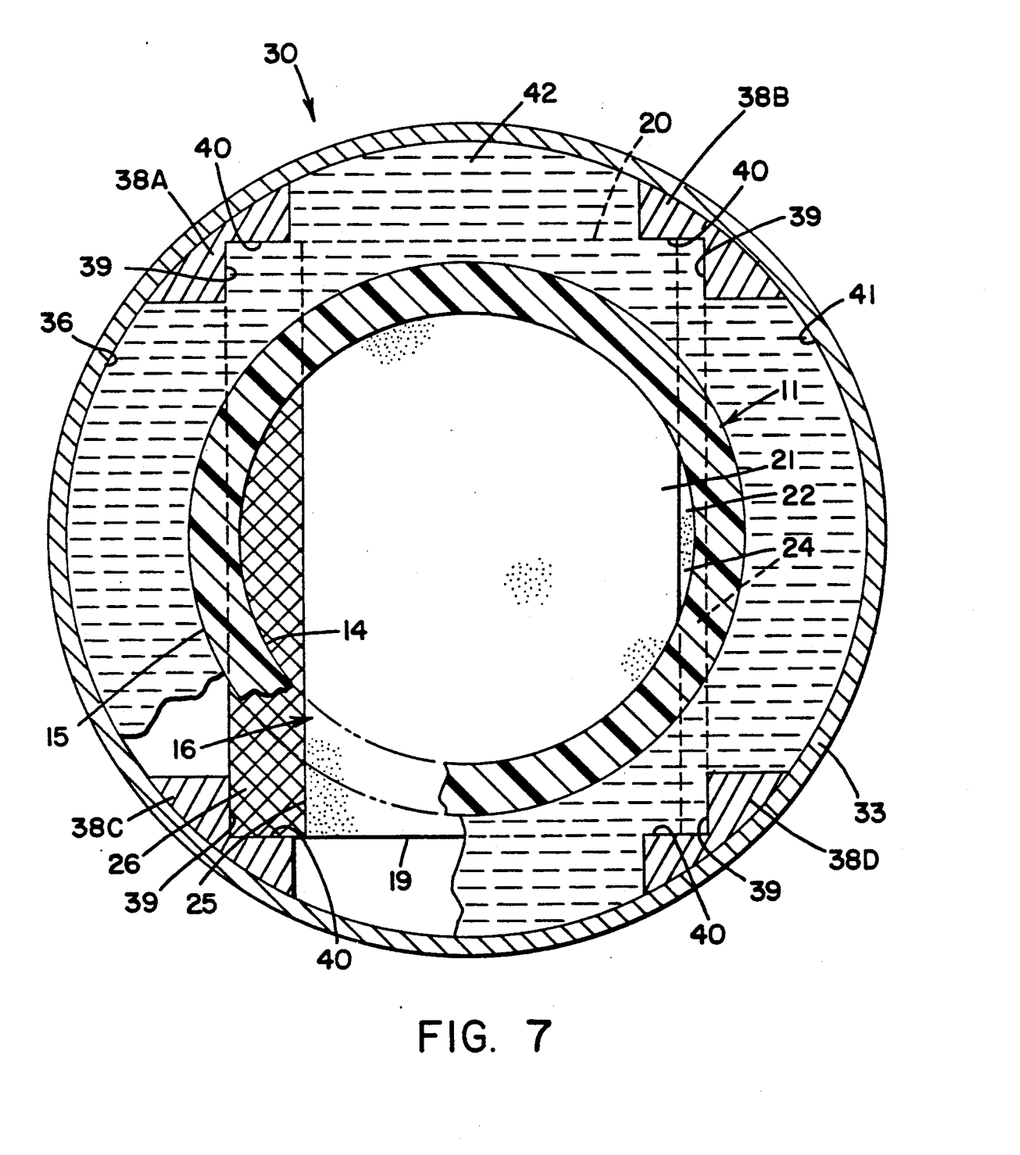
FIG. 7 is a top view of the mold for fabricating the wafer after the deposition of wax and epoxy compound during fabrication.
Figure 9:
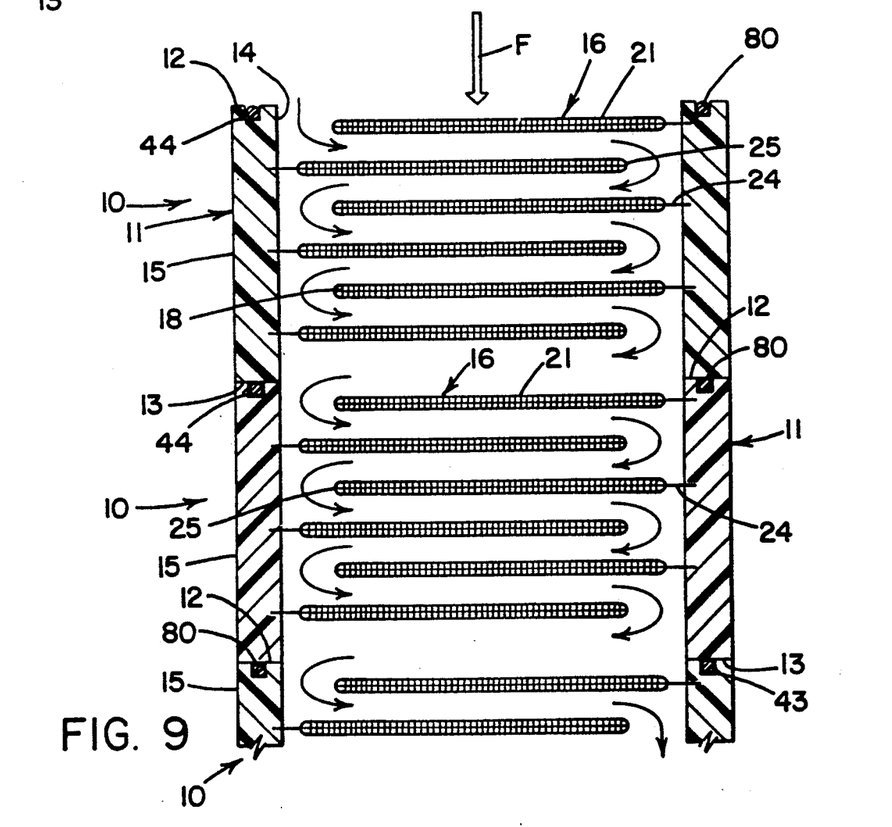
FIG. 9 is a schematic view of a plurality of wafer members, in axial alignment with support shelves removed to depict the feedstream flow over and around the membrane sleeves.

While the potting mold is spinning, a first solidifiable liquid such as melted wax, a quick setting epoxy or the like is poured onto the slinger plate 35. The wax is flung from the slinger plate and flows to the periphery 41 of the mold where it forms a ring 42 due to the centrifugal force. The wax is allowed to cool and harden. Next, a pottant material such as epoxy, or second solidifiable material, is poured into the mold to form a second ring, annular ring 11, of smaller diameter supported on the ring of wax. It is important that the wax level be sufficiently high to prevent epoxy from entering the open ends of the membrane sleeves (FIG. 7). By this means, an epoxy tubesheet, ring 11, is formed with the wax sealed membrane sleeves penetrating the ring of epoxy at both sides. By positioning the sealed seam 24 of the membrane sleeves 16 within the epoxy ring, the temporary seal is made permanently secure by being potted in the epoxy and a barrier is formed which blocks the flow of feed fluid on one side of the transverse membrane sleeve. Because the orientation and offset of the membrane sleeves 16 is staggered, the feed fluid is thus forced to flow in a serpentine path from one side of the wafer to the other as it moves axially as depicted in FIG. 9.

After the epoxy has hardened sufficiently, mold rotation is stopped and the wax and epoxy assembly is removed from the mold 30 by first heating to melt enough of the wax to free the assembly from the mold wall and brackets 38A-38D. Next, the wax and excess membrane sleeve length which protrudes beyond the periphery of the epoxy ring 11 is removed by slicing while turning the wafer on the lathe fixture. The wax can be recovered to be reused by melting the wax and filtering out the embedded debris. The trimmed wafer is heated to a temperature above the melting point of the wax to allow any remaining wax to flow out of the wafer. The flat sides of the wafer are finished as necessary to make suitable sealing surfaces for the wafer stack. Preferably, the mold top 34 is provided with an annular rim 43 which forms a channel 44 for receipt of an O-ring to effect a seal between wafers when they are stacked together axially.

Figure 8:
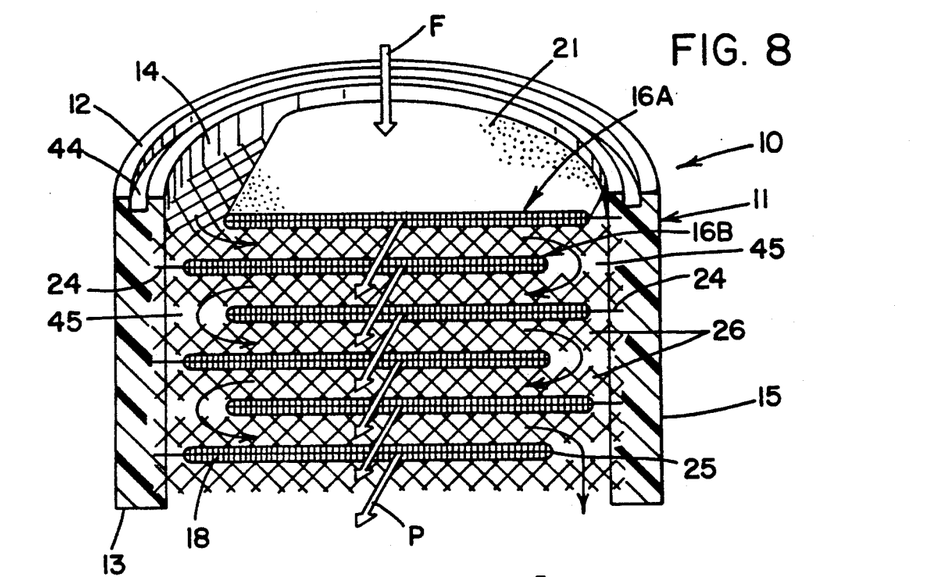
FIG. 8 is a perspective view, partially in section, of a single wafer member.

In FIG. 8, a section of a wafer 10 is depicted. A feedstream material which can be gas or liquid, is depicted by the arrows F, and enters the wafer 10 to contact the first wafer sleeve 16A. A portion of the feedstream will be permeable to the membrane sheet 21 while the majority will flow around the end 25 and through the porous shelf 26, separating sleeves 16A and 16B. Because the second sleeve 16B terminates short of the ring 11, a void 45 is provided for passage of the feedstream material. The feedstream fluid cannot pass through the sleeve seam 24 at the opposite end and thus, the fluid flows axially through the wafer in a serpentine path (FIG. 9) defined by the staggered membrane sleeves.

Figure 4:
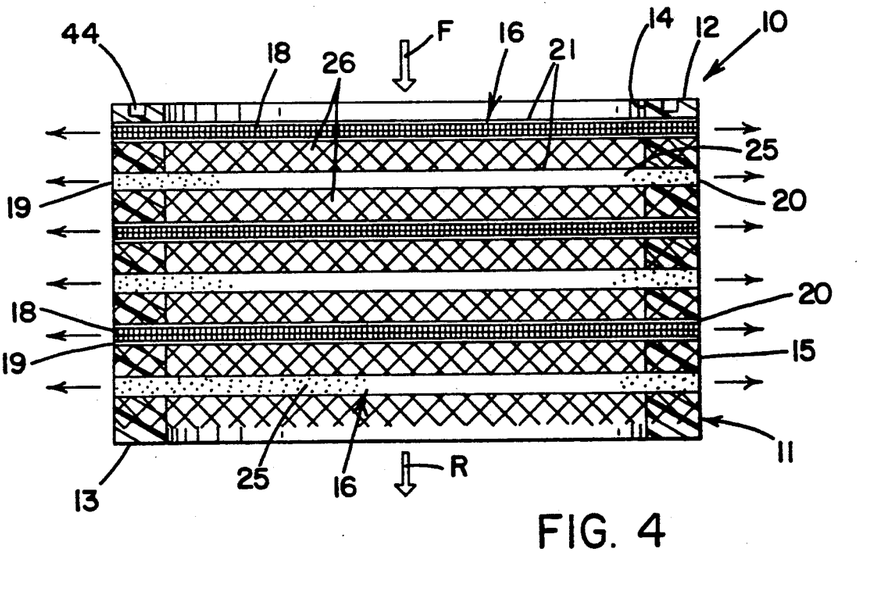
FIG. 4 is a cross-section of a wafer of the present invention taken substantially along lines 4—4 of FIG. 1.

In this manner, the fluid contacts both sides of each membrane sleeve and is in residence within the wafer 10 for a sufficient time to allow permeable material to flow into the sleeve interior, which is maintained by the web 18. Once within the sleeve 16, this material or permeate flows within the sleeve in a direction perpendicular to the wafer 10. Because the sleeves 16 pass through the ring 11 of each wafer, as depicted in FIG. 4, the permeate P exits the exterior surface 15 while the remaining fluid or retentate R passes axially through the wafer 10. While a wafer can be provided with enough membrane sleeves to filter a given volume of feedstream in normal practice, a plurality of wafers 10 can be stacked axially within a cylindrical apparatus or module.

Figure 10:
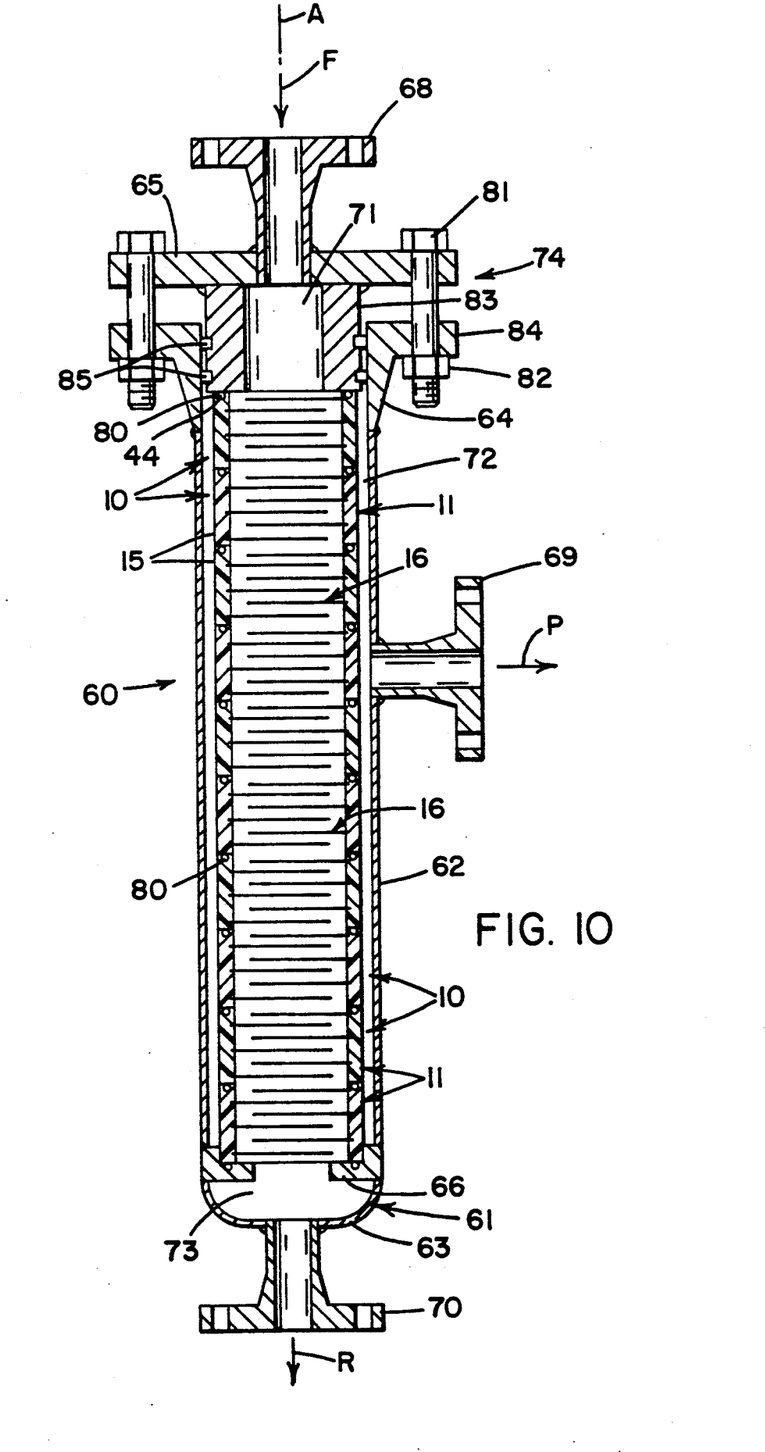
FIG. 10 is a side elevation, in section, of a transverse sheet membrane module according to the present invention.

With reference to FIG. 10, the module of the present invention is indicated generally by the numeral 60. It employs a vessel 61 which comprises a cylindrical housing 62, base 63, upper housing 64 and removable top 65. Near the bottom of housing 62 a support shelf 66 is provided upon which the wafers 10 are stacked. Module 60 also provides feed, permeate and retentate ports 68, 69 and 70, respectively, as well as feedstream chamber 71, permeate chamber 72 and retentate chamber 73, which will be discussed hereinbelow. Finally, means for compressing the stack of wafers, referred to generally by the numeral 74, are provided.

The cylindrical housing 62 and base 63 and upper housing 64 are preferably constructed of steel or other metal such as stainless steel. Although they may be manufactured as separate components, they are joined together by welding or other suitable means to form a continuous one-piece module 60, to which the top 65 is affixed. The use of metal of proper thickness is desirable as a safeguard against catastrophic failure of one or more wafers.

The wafers 10 are placed within the module 60 with the first one rested upon internal shelf 66 and each subsequent one resting on the preceding wafer. In order to aid in the insertion and withdrawal of the wafers 10 they can first be loaded into a cylindrical wire basket or cage (not shown) which is itself then lowered into the module 10. During assembly and subsequent use of the module 60 it is important that the wafers 10 be sealed together to prevent the feedstream from passing between contiguous rings 11 and contaminating the permeate. As best depicted in FIGS. 1 and 9, this is accomplished by fitting O-rings 80 into recesses 43 in the upper face 12 of each ring 10. An O-ring can also be located on internal shelf 66.

The wafers 10 are sealed together by compression means 74 as shall be explained next. Compression means 74 comprises generally a plurality of bolts and nuts 81 and 82 and a throat member 83. An outer flange 84 is part of upper housing member 64 to which the top 65 is affixed by bolts 81, which pass through axially aligned bores in flange 84 and top 65, and nuts 82. Feed port 68 is welded or otherwise affixed within top 65 and member 83 is affixed at its opposite end. The feedstream F is fed into the port 68, through the feed chamber 71, defined by the throat 83, and into contact with the uppermost wafer 10. The throat 83 carries at least one metal piston ring 85 within an O-ring groove to seal the permeate chamber 72 and it rests against the uppermost wafer 10. Use of a piston ring provides a safeguard where the module 60 is employed with flammable feedstreams. It should be evident that as the top 65 and flange 84 are joined together, the throat 83 urges the stack of wafers firmly against support shelf 66.

Flow of the feedstream through the wafer 10 and the module 60 is depicted schematically in FIG. 9. For clarity, the support shelves 26, which may be optionally employed, have been removed. The length of the module is sufficient to insure that when the feedstream has passed through all of the wafers, the retentate, exiting the last wafer is relatively free of the material that was filtered, the permeate.

The module 60 has been described generally herein. A more complete description of the module and variations thereof, as presented in U.S. Pat. No. 4,959,152 owned by the Assignee of record, the subject matter of which is incorporated herein by reference. Irrespective of the module construction selected, the wafers of the present invention can be employed to produce a separation apparatus capable of separating a variety of gas mixtures and liquid mixtures, depending upon the composition of the semipermeable membrane 21 selected to form the sleeves 16.

The present invention also provides a method for the separation of fluid feedstreams into permeate and retentate portions. As noted hereinabove, the fluid that can be separated can include gaseous mixtures or liquid mixtures. The fluid feedstream, gas or liquid, is fed to the module 60 via port 68 into the feedstream chamber 71. The module provides a plurality of wafers 10 which separate the feedstream chamber 71 at one end, from the retentate chamber 73, at the opposite end. The wafers 10 are arranged axially as individual units, compressed together in the module 60 and the like.

The fluid is directed from the inlet passageway through the wafers and over and around each membrane sleeve 16. As should be apparent from the foregoing disclosure, each membrane sleeve is oriented perpendicularly to the longitudinal axis A of the module. Within each wafer, the permeable portion of the fluid enters the sleeve 16 and flows through the web 18 thereof and through the peripheral support 11 of the wafer to enter the permeate chamber 72. The latter is formed between the walls of the module and the coaxially aligned supports 11 of the wafers. In this step the fluid becomes separated into permeate and retentate portions which are ultimately removed from the module.

Variations to the foregoing wafers and modules as well as additional embodiments are described next, with reference to FIGS. 11-15.

Figure 1:
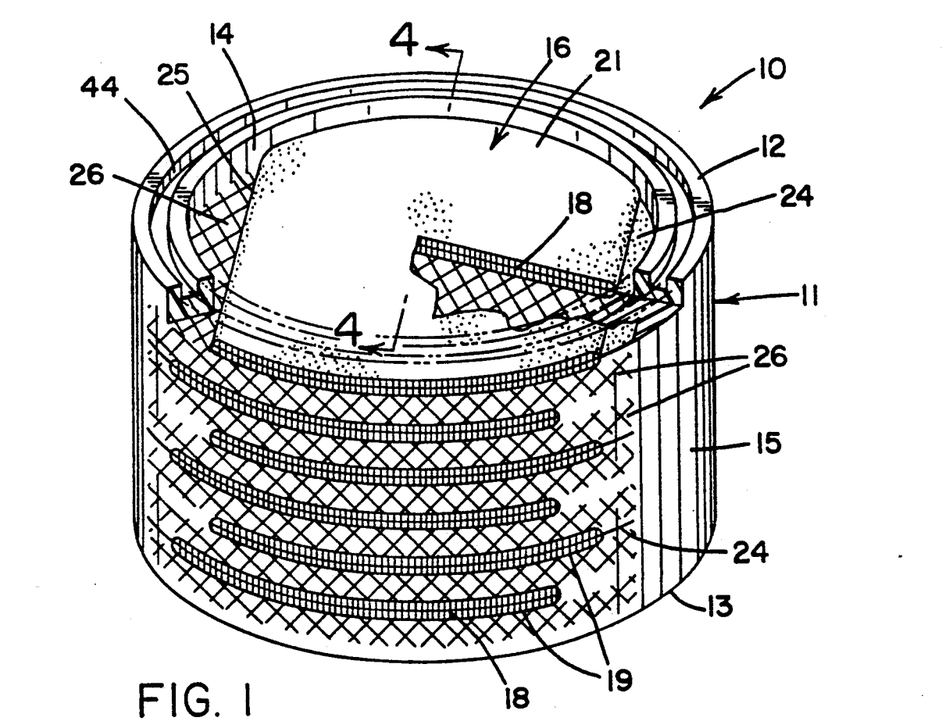
FIG. 1 is a perspective view of a wafer member of the present invention, partially broken away to show the individual membrane sleeves.
Figure 11:
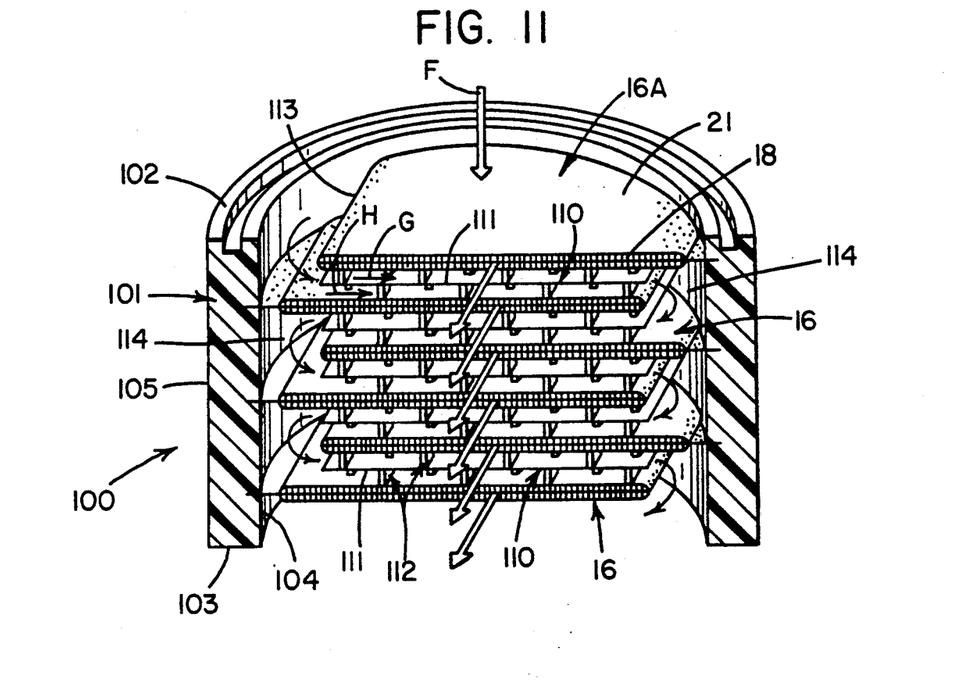
FIG. 11 is a perspective view, partially in section, of an alternative single wafer member, containing membrane sleeves and baffle plates with baffles.

In FIG. 11, a section of a wafer 100, similar to that in FIGS. 1 and 8 is depicted. The wafer 100 comprises an outer annular potting ring or peripheral support means 101 having upper and lower surfaces 102 and 103, respectively, and inside and outside cylindrical surfaces, 104 and 105, respectively. A plurality of short sleeves 16 of sheet membrane material 21 are wrapped around a support material 18 and are arrayed in a staggered, transverse and perpendicular orientation to the axis of the wafer. Each sleeve 16 is integrally mounted within the potting ring 101 and the opposite ends 19 and 20 thereof penetrate the ring and terminate at the outer surface 105. To this stage, the wafer 100 is identical to the wafer 10.

The principal difference between wafers 10 and 100 is that the latter employs baffle plates, indicated by the numeral 110, in lieu of the porous shelves 26, described hereinabove. The baffle plates 110 separate adjacent sleeves 16 and are positioned therebetween.

Each baffle plate 110 includes a flat, thin sheet of material 111 which connects a plurality of baffles 112. The baffles 112 extend outwardly above and below the thin sheet 111 in a pattern described below to create a unique flow of the feedstream. The baffle plates 111 can be made of molded plastic or any other material suitable to the concepts of this invention and can be either permeable or impermeable.

As depicted in FIG. 11, a feedstream material which can be a gas or liquid, is denoted by the arrow F and enters the wafer 100 to contact the first sleeve 16A. A portion of the material will permeate through the membrane material while the majority will flow around the end 113 of the sleeve 16A. Unlike the porous shelves 26, the width of baffle plates 110 must necessarily begin and end short of the potting ring 101 to permit the feedstream to flow above and below the plate 110. However, as indicted in FIG. 12, the length of the baffle plate 110 is potted within the ring in the same manner as described for the porous shelves 26 hereinabove. It is preferable to have the baffle plates 110 terminate substantially even with the ends 113 of the sleeves 16.

Inasmuch as the flat, thin sheet 111 of the baffle plate 110 need not be permeable, the feedstream flow F is divided into two distinct feedstream G, H which flow above and below the thin sheet 111, respectively. The feedstreams G, H will converge back into one flow F at the end of the thin sheet 111, where a void 114 is provided for passage of the feedstream material which has not yet permeated through the membrane sheets. The feedstream will divide again as it flows across the next baffle plate, and will flow axially through the wafer 100 in a serpentine path defined by the staggered membrane sleeves as described hereinabove and depicted in FIG. 9.

Figure 12:
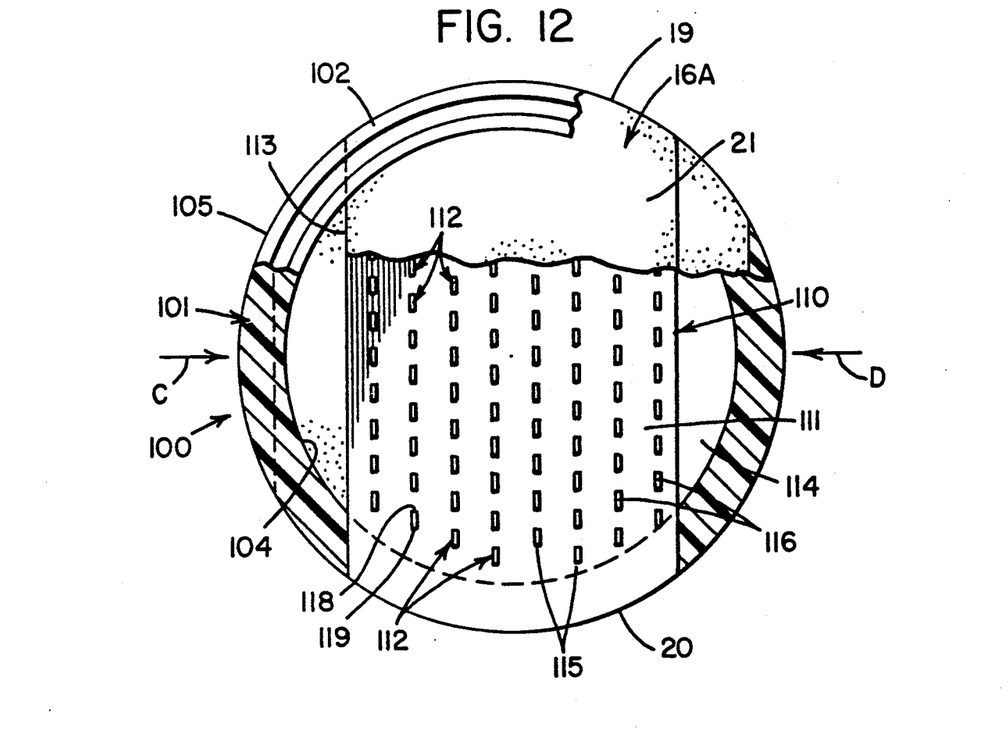
FIG. 12 is a top plan view of a single wafer member depicting a top membrane sleeve, partially in section, to show a baffle plate having baffles to form vortices in the fluid flow under influence of externally imposed pulsation in the flow of the fluid.

One preferred embodiment of the baffle plate 110 is depicted, in part, in FIG. 12. The membrane sleeve 16 above the baffle plate 110 has been partially cut away to reveal the preferred orientation of the baffles 112 on the baffle plate which generate vortices when subjected to externally-induced bi-directional pulsatile flow. The feedstream will generally flow across the baffle plate 110, from left to right and from right to left as indicated by the arrows C and D, respectively. The baffles 112, are positioned in generally parallel rows 115 across the baffle plate 110, substantially perpendicular to the general flow of the feedstream. Each baffle 112 is offset between two baffles of the row before and after it and is spaced apart from adjacent, successive baffles in the same row. Thus baffles 112 in every other row are aligned in columns 116 substantially parallel to the feedstream flow C, D.

Figure 14A:
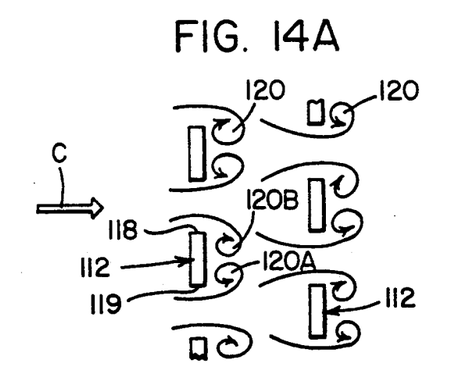
FIG. 14A-14B depict schematically, the vortices created by one embodiment of baffles during induced fluid flow reversal.
Figure 14B:
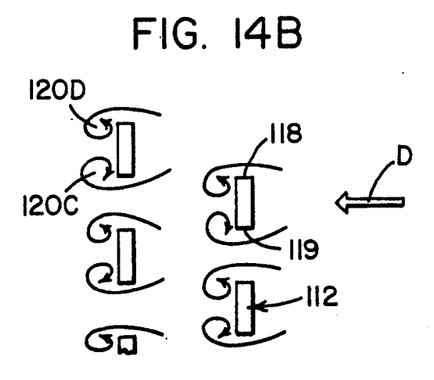

With reference to FIGS. 12, 14A and 14B, a preferred embodiment of the baffles 112 has a rectangular configuration to generate vortices under bi-directional pulsatile flow. As depicted FIG. 14A, the feedstream flow F forces the major flow, indicated by the arrow C, of the feedstream material around either side 118, 119 of the baffles 112. The configuration and orientation of the baffles 112 produce vortexes 120 of the feedstream material behind each baffle 112, one vortex 120A swirling counter-clockwise and the other vortex 120B, clockwise. A minor, reverse flow occurs as indicated by the arrow D in FIG. 14B. The reverse flow takes the feedstream material back around the sides 118, 119 of the baffles 112 and produces vortices 120C, 120D in front of the baffles 112. Eventually, the feedstream material is forced through the baffle plate by the general flow. This flow process repeats around each baffle and baffle plate provided in the wafer 100.

Figure 13:
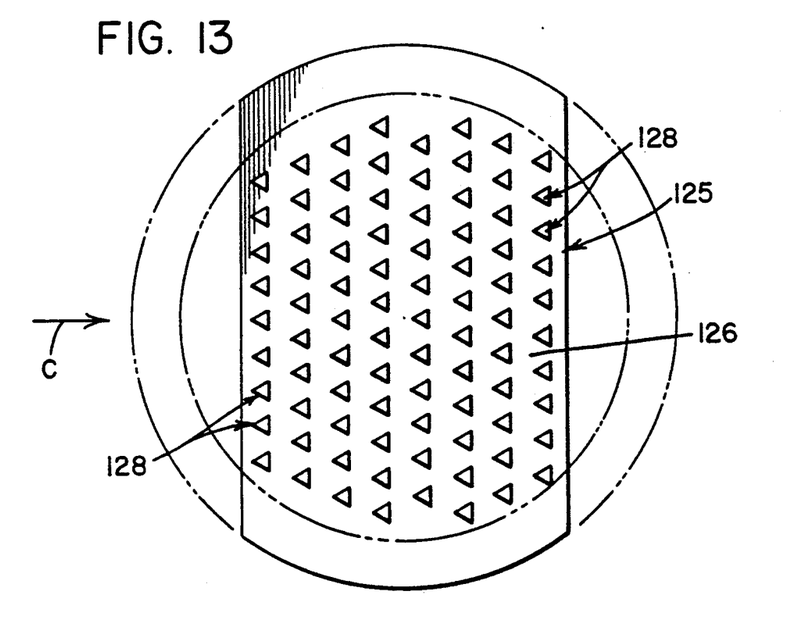
FIG. 13 is a top plan view of a baffle plate contained within the peripheral wall of a wafer showing an alternative embodiment of baffles which are designed to effect unidirectional vortex shedding.
Figure 15A:
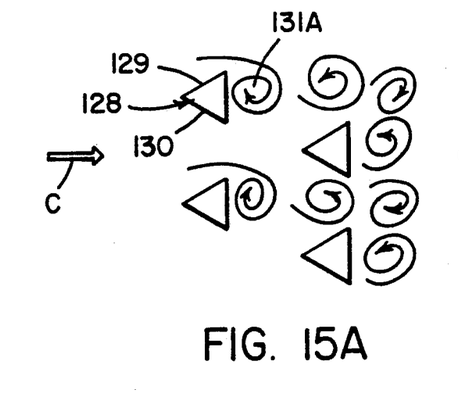
FIG. 15A-15B depict schematically, the unidirectional flow of fluid with vortex shedding created by an alternative embodiment of baffles and steady fluid flow.
Figure 15B:
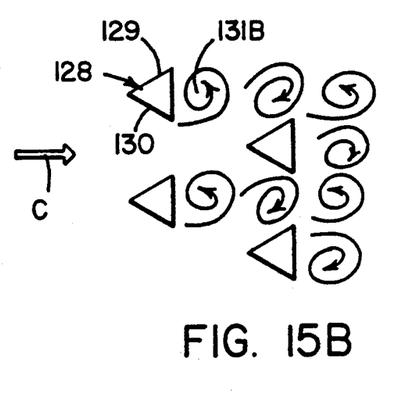

With reference to FIGS. 13, 15A and 15B, an alternative embodiment of baffle plate is depicted. The baffle plate, indicated generally by the numeral 125, comprises thin sheet member 126 and baffles 128 having a triangular configuration with an angle directed substantially into the major feedstream flow C to generate unidirectional flow with vortex shedding. As depicted in FIGS. 15A and 15B, the flow of the feedstream material will substantially flow around either one side 129 of the triangular baffle 128 or the other 130, and produce a vortex 131A having a rotation compatible with the side 129 the flow entered. The vortex will eventually "shed" away from the baffle 128, permitting another vortex 131B to be produced in its place. This next vortex 131B will begin from a flow of feedstream material which flows around the opposite side 130 of the baffle 128 and has an opposite rotation from the previous vortex 131A. This vortex 131B will eventually "shed" from behind the baffle 128, and the next vortex (not shown) having the same rotation as vortex 131A will develop. This process will continue to repeat itself as discussed in the preceding paragraph.

The method described hereinabove with reference to FIGS. 5 and 6 can also be employed for the manufacture of the transverse sheet wafers 100 and the baffle plates 110 by substituting baffle plates 110 or 125 for the porous support shelves 26. Similarly, the wafer 100 can be substituted for the wafer 10 in the separation module 60, described hereinabove, and thus, the assembly and use thereof shall not be repeated herein.

Based upon the foregoing description and examples, it should be apparent that the modules and wafers disclosed herein fulfill the objects of the present invention. The modular nature of the individual wafers allows modules of almost any length to be assembled from one size of wafer, merely by adding wafers to the stack. Many different module configurations can be assembled with only a few different wafer diameters. Moreover, wafers can be tested individually prior to assembly of the module and thus, defective wafers can be removed from the module and discarded with less loss of semipermeable membrane, than where an entire conventional module must be replaced because the membrane component, sheets or hollow fibers, would be continuous over the length of the module.

As should now be apparent the transverse sheet membrane modules provide several advantages over the plate and frame and spiral wrap types. Because fluid flow pressure losses of the permeate in the membrane sleeve are detrimental to the performance of membrane separation processes, the longer the flow path in the sleeve, the more performance is adversely affected. Cost considerations, however, favor larger diameter modules with fewer sleeve connections at the permeate manifold which require longer sleeves. An economic trade-off must be made between the module diameter, the number of membrane sleeve connections, and the performance penalty incurred by the sleeve length. Conversely, the modules of the present invention are composed of a large number of short membrane sleeves which are efficiently potted in a single process. Permeate flow losses in the membrane sleeve can be controlled to very low levels and/or the thickness of the porous support material can be reduced for a higher volumetric packing efficiency in the module.

Second, in the module design of the present invention, membrane sleeves are not subject to bending or significant compression force as during spiral wrapping. Once the membrane sleeves are placed in the centrifugal potting mold, they are not subject to additional handling and once potted, the sleeves are not subject to any mechanical stresses. Third, the module design of the present invention imbeds the potentially weak membrane side seam seal in epoxy. A rigid cylinder of epoxy handles all modularization forces and protects the membrane surface from accidental damage during assembly and transportation.

Fourth, the wafers are modular building blocks for the transverse sheet membrane modules. The modular nature of the wafers allows modules of almost any length to be assembled from one size of wafer. Many different module configurations can be assembled with a few different wafer sizes. Higher production yields can be achieved because wafers can be tested individually prior to module assembly. Defective wafers can be eliminated with less loss of assembly time and with smaller loss of membrane than discarding a whole module. If an average module is made of twenty wafers, then a catastrophic defect can be eliminated by discarding 5 percent of the module rather than 100 percent.

Finally, the module designs of the present invention have higher feed fluid flow velocities than a comparable diameter spiral wrap module. The serpentine flow path of the feed fluid insures a high velocity at the fluid/membrane interface which reduces the tendency of retentate to concentrate near the membrane surface by keeping it swept away with the bulk feed fluid flow. Reduced concentration polarization results in better membrane performance.

In conclusion, it should be clear to those skilled in the art the manner in which the transverse sheet membrane wafers described herein are constructed, assembled and used. Based upon the foregoing disclosure, it should also be apparent that the use of the wafers and modules described herein will carry out the objects set forth hereinabove. It will also be apparent to those skilled in the art that the modules of the subject invention can readily be utilized in conjunction with various types of feedstream separations.

It is to be understood that any variations evident fall within the scope of the claimed invention; therefore, the selection of specific component elements can be determined without departing from the spirit of the invention herein disclosed and described. Moreover, the scope of the invention shall include all modifications and variations that may fall within the scope of the attached claims.

I claim:

1. A wafer providing transverse sheets of semipermeable membrane comprising:
   peripheral support means defining a generally cylindrical ring having inside and outside surfaces;
   a plurality of continuous transverse sheet membrane sleeves of essentially equal dimensions carried within said peripheral support means and having opposed ends which pass through said peripheral support means thereby providing a communication from the inside to the outside of said wafer; and
   a plurality of baffle plates carried between adjacent membrane sleeves.

2. A wafer, as set forth in claim 1, wherein said transverse sheet membrane sleeves comprise
   a continuous porous support web and
   a continuous semipermeable membrane sheet wrapped therearound forming said sleeve.

3. A wafer, as set forth in claim 1, wherein said baffle plates comprise
   sheet members, generally flat and parallel to said sleeves; and
   a plurality of baffles extending from the top and bottom surfaces of said sheet members and communicating with said sleeves adjacent thereto;
   said baffles being arranged in rows and columns whereby the flow of a feedstream between said sleeves is interrupted upon contact with said baffles.

4. A wafer, as set forth in claim 1, wherein each said sleeve has an elongate seam passing between said opposed ends, at least partially embedded in said peripheral support means, and an edge opposite said seam terminating a short distance from said inside surface of said peripheral support means and forming a chord-like void therebetween.

5. A wafer, as set forth in claim 4, wherein said seam of one sleeve is oriented over said edge of the next sleeve in alternating fashion as to all sleeves within said wafer.

6. Apparatus for the separation of a fluid feedstream into permeate and retentate portions comprising:
   a plurality of transverse sheet membrane wafers, each said wafer comprising
      peripheral support means defining a generally cylindrical ring;
      a plurality of continuous transverse sheet membrane sleeves of essentially equal dimensions carried within said peripheral support means and having opposed ends which pass through said peripheral support means thereby providing a communication from the inside of said sleeves to the outside of said wafer; and
      a plurality of baffle plates interspersed between adjacent membrane sleeves;
   vessel means providing a first port for receiving the fluid feedstream, a second port for withdrawing said retentate and a third port for withdrawing said permeate;
   means for compressing said at least one wafer within said apparatus; and
   permeate chamber means within said vessel, separate from said feedstream and said retentate by said means for compressing and said peripheral support means.

7. Apparatus, as set forth in claim 6, wherein each said transverse sheet membrane sleeve comprises
   a continuous porous support web and
   a continuous semipermeable membrane sheet wrapped therearound forming a sleeve.

8. Apparatus, as set forth in claim 6, wherein said baffle plates comprise
   sheet members, generally flat and parallel to said sleeves; and a plurality of baffles extending from the top and bottom surfaces of said sheet members and communicating with said sleeves adjacent thereto;

said baffles being arranged in rows and columns whereby the flow of said feedstream between said sleeves is interrupted upon contact with said baffles.

9. Apparatus, as set forth in claim 6, wherein each said sleeve has an elongate seam passing between said opposed ends, at least partially embedded in said peripheral support means, and an edge opposite said seam terminating a short distance from the inside face of said peripheral support means and forming a chord-like void therebetween.

10. Apparatus, as set forth in claim 9, wherein said seam of one sleeve is oriented over said edge of the next sleeve in alternating fashion as to all sleeves within said wafer.

11. Apparatus, as set forth in claim 6, wherein said vessel means includes elongate body means, closed at one end, and internal shelf means for receiving and supporting said plurality of wafers in axial alignment; and end cap means, removably affixed to the opposite end of said elongate body means, said first port being affixed to said end cap means.

12. Apparatus, as set forth in claim 11, wherein said means for compressing includes said internal shelf means and said throat means and means for connecting said end cap means to said elongate body means, whereby said wafers become maintained in axial alignment between said internal shelf means and said throat means.

13. A method for the manufacture of separation wafers having an outer peripheral wall and a plurality of continuous semipermeable membrane sheet sleeves and baffle plates carried transversely within said wafer comprising the steps of:

providing a rotatable mold, partially closed at the top by a slinger plate;

placing a plurality of said semipermeable membrane sleeves of essentially equal dimensions and said baffle plates within said rotatable mold in alternating layers;

rotating said mold at high speed while pouring a first solidifiable liquid onto said slinger plate to form a first annular ring within said mold encompassing a portion of said sleeves;

pouring a second solidifiable liquid onto said slinger plate to form said outer peripheral wall, encompassing a greater portion of said sleeves;

stopping the rotation of said mold and removing the assembly of components therefrom; and removing said first ring and said sleeves encompassed therein from said outer peripheral wall whereby a portion of said sleeves pass through said peripheral wall and open to the exterior of said wafer.

14. A method, as set forth in claim 13, wherein each said sleeve comprises a porous support web wrapped in a sheet of semipermeable membrane, the overlapping ends thereof are joined to form a seam protruding away from said web and wherein said step of placing includes the steps of positioning one of said sleeves in the bottom of said mold;

positioning one of said baffle plates thereover;

repeating said steps of positioning until said mold is almost full; and alternating the orientation of said seams of consecutive sleeves between 180° intervals within said mold.

15. A method, as set forth in claim 14, including the further steps of wrapping a porous support web with a sheet of semipermeable membrane sheet, so as to provide opposed ends which pass through said outer peripheral wall, and joining the overlapping ends in a seam protruding away from said web to form said sleeve.

16. A method for the separation of fluid feedstreams into permeate and retentate portions comprising the steps of:

providing a separation module having a feedstream inlet and a retentate chamber, connected by at least one wafer within said module; each said wafer comprising peripheral support means;

a plurality of continuous semipermeable membrane sleeves of essentially equal dimensions arranged chord-wise of said wafer and having opposed ends which pass through said peripheral support means thereby providing a communication from the inside of said sleeves to the outside of said wafer; and a plurality of baffle plates interspersed between adjacent membrane sleeves;

directing said feedstream through said feedstream inlet and over said wafer;

separating said feedstream into a permeate portion, which permeates said membrane sleeves and flows through said peripheral support means into said permeate chamber, and a retentate portion, which passes around said membrane sleeves and into said retentate chamber; and removing said permeate and said retentate from said module.

* * * * *